United States Patent [19]
Lowdon

[11] Patent Number: 6,073,019
[45] Date of Patent: Jun. 6, 2000

[54] RADIO TELEPHONE CALL HANDOVER

[75] Inventor: Christopher John Lowdon, Cambridge, United Kingdom

[73] Assignee: Nokia Telecommunications Oy, Espoo, Finland

[21] Appl. No.: 08/849,141

[22] PCT Filed: Oct. 22, 1996

[86] PCT No.: PCT/GB96/02590

§ 371 Date: Jul. 17, 1997

§ 102(e) Date: Jul. 17, 1997

[87] PCT Pub. No.: WO97/16892

PCT Pub. Date: May 9, 1997

[30] Foreign Application Priority Data

Nov. 1, 1995 [GB] United Kingdom ................... 9522348

[51] Int. Cl.[7] .................................................. H04Q 7/20
[52] U.S. Cl. ........................... 455/436; 455/14; 455/523; 455/524
[58] Field of Search .............................. 455/41, 436, 523, 455/14, 116, 437, 443, 524, 525

[56] References Cited

U.S. PATENT DOCUMENTS

| | | | |
|---|---|---|---|
| 4,006,315 | 2/1977 | Halstead | 455/14 |
| 5,420,883 | 5/1995 | Swensen et al. | 375/200 |
| 5,496,003 | 3/1996 | Bernard | 246/29 |
| 5,603,080 | 2/1997 | Kallander et al. | 455/14 |
| 5,913,168 | 6/1999 | Morau et al. | 455/441 |

FOREIGN PATENT DOCUMENTS 24 02 600   7/1975   Germany.

OTHER PUBLICATIONS

Patent Abstracts of Japan, vol. 011, No. 292, JP 62 091026.
Patent Abstracts of Japan, vol. 016, No. 392, JP 04 127726.
Patent Abstracts of Japan, vol. 009, No. 140, JP 60 022834.
Patent Abstracts of Japan, vol. 012, No. 111, JP 62 242427.

*Primary Examiner*—Curtis A. Kuntz
*Assistant Examiner*—Binh K. Tieu
*Attorney, Agent, or Firm*—Perman & Green, LLP

[57] ABSTRACT

Radio telephone apparatus for use in an underground railway system comprises two base stations 3, 4 respectively located at successive railway stations 1, 2. The base station 3 feeds a radiating cable 7 extending in the tunnel bore towards the base station 4 which feeds a radiating cable 12 extending in the tunnel bore towards the base station 3. When a train travels from the station 1 to the station 2, the mobile radio on the train effects call handover, ie transference of communication with cable 7 to communication with cable 12. To ensure no interruption in a call during handover, an attenuator 16 is incorporated in the cable 7 adjacent its end, such that the mobile radio effects call handover to the cable 12 before losing communication with the cable 7, even at the maximum possible speed of the train.

8 Claims, 1 Drawing Sheet

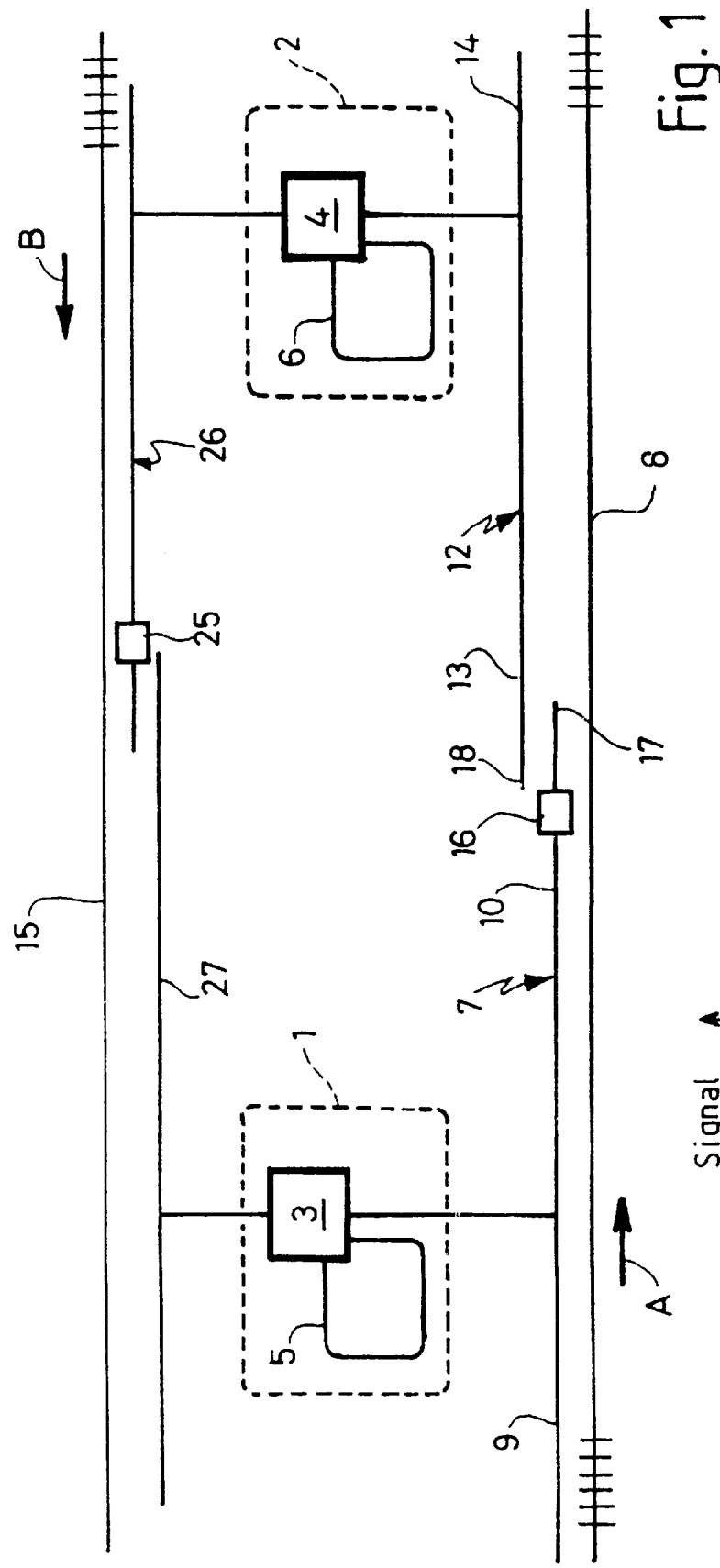

RADIO TELEPHONE CALL HANDOVER

BACKGROUND OF THE INVENTION

This invention relates to apparatus for and a method of effecting call handover in a radio telephone system in which a mobile radio moves with respect to cables which are leaky or lossy cables radiating radio fields detected by the mobile radio.

Call handover occurs when the mobile radio transfers communication from one cable to another cable. An example of such a known system is in an underground railway. Each railway station is equipped with a radio base station serving that particular railway station. Also, each base station serves an adjacent length of tunnel bore by means of a cable which extends from the base station along the tunnel bore both towards the preceding station and towards the succeeding station, in relation to the direction of travel of trains through the tunnel bore. The train carries the mobile radio, the front of the train being fitted with an antenna which makes radio communication with the cable extending along the tunnel bore. In proceeding from one railway station to the next railway station, the mobile radio must therefore transfer its communication (ie effect call handover) from one cable to another cable, this taking place approximately half-way between the railway stations where one cable ends and the next begins.

In known systems, call handover relies upon the detection by the mobile radio of the reduction of radio field as the mobile radio reaches the end of the cable. This triggers the mobile radio to search for a new channel available at the base station located at the railway station towards which the train is travelling. During call handover, an existing call will be uninterrupted only if the mobile radio can continue to communicate with the cable about to terminate. Call handover typically takes a quarter of a second or slightly more, which at 110 km per hour corresponds to a distance travelled of about 30 meters. The length of train tends to shield the antenna after the front of the train has moved 10 meters or more from the end of the cable, so there will be a partial loss of call. The invention aims to provide an apparatus and a method which overcomes this problem.

SUMMARY OF THE INVENTION

According to one aspect of the invention there is provided radio telephone apparatus comprising a first cable for radiating a first radio field, a second cable for radiating a second radio field, and an attenuator for incorporation in the first cable adjacent an end thereof so that in use when a mobile radio effects call handover from the first radio field to the second radio field the reduction in strength of the first radio field resulting from the attenuator causes the mobile radio to initiate call handover and to complete call handover before the strength of the first radio field diminishes to an unusable level.

According to another aspect the invention provides radio telephone apparatus comprising a first base station, a first radiating cable extending from the first base station to a remote end, a second base station, a second radiating cable extending from the second base station and terminating in a remote end, the two remote ends being located in a transition area where a mobile radio effects call handover from the first base station to the second base station, an attenuator being incorporated in the first radiating cable adjacent the end thereof to cause the mobile radio to sense the diminution in radiated signal caused by the attenuator and thereby to commence call handover from the first base station to the second base station.

According to a yet further aspect the invention provides a method of effecting call handover of a mobile radio from a first radiating cable to a second radiating cable in a radio telephone system, comprising using an attenuator near the end of the first cable to cause a marked decrease in the strength of signal radiated by the first cable and sensing the decrease at the mobile radio to prompt the mobile radio to initiate call handover from the first cable to the second cable and to maintain communication with the first cable until handover to the second cable is accomplished.

The positioning of the attenuator defines the position at which the mobile radio commences its call hangover routine. By arranging for the length of the first cable between the attenuator and the end of the first cable to be at least as much as the distance travelled by the mobile radio at its maximum possible speed, call handover without interruption is assured.

DESCRIPTION OF THE DRAWING

The invention will now be described, by way of example, with reference to the accompanying drawings, in which:

FIG. 1 is a diagram of a radio telephone system according to the invention as fitted in an underground railway, and FIG. 2 is a graph showing signal strengths detected by the mobile radio carried by the train plotted against the position of the front of the train.

Referring to FIG. 1, two successive railway stations on an underground railway line are indicated at 1 and 2. The railway stations have respective base stations 3 and 4 which are similar to base stations in a cellular radio system in that each base station is linked, generally by hard wiring, to a telephone exchange. The base stations 3 and 4 have respective cable loops 5 and 6 which extend around the areas of the railway stations (eg platforms, subways and concourse) so that people equipped with mobile handsets can make and receive telephone calls through the respective base stations 3 and 4. It is envisaged that the people equipped with the necessary mobile handsets will be station personnel, security personnel or similarly authorised people, but it is possible for the radio telephone system to be accessible to members of the public provided with the usual cellular radio handsets.

The base station 3 also feeds a radiating cable 7 which extends along the tunnel bore linking the stations 1 and 2. The bore accommodates a single length of railway track 8 along which trains normally run in the same direction, indicated by arrow A. The cable 7 has a first portion 9 extending from the station 1 towards the preceding railway station and a second portion 10 extending from the station 1 towards the next station 2. Similarly, the base station 4 feeds a second cable 12 within the bore, the cable 12 having a first portion 13 extending towards the station 1 and a second portion 14 extending towards the next railway station along the line. The cables 7 and 12 are leaky or lossy in that they radiate radio fields corresponding to the electrical signals from the respective base stations 3 and 4. The cables 7 and 12 are supported by hangers on the walls of the bore so that the cables 7 and 12 extend longitudinally within the bore accommodating the track 8 along which the trains pass (in direction A) from the station 1 to the station 2. A second tunnel bore accommodating a second railway track 15 is provided to take trains in the opposite direction B from the station 2 to the station 1.

In accordance with the invention, an attenuator 16 is incorporated in the first cable adjacent its end 17. In practice, the end section of the cable 7, ie the length between the attenuator 16 and the extreme end 17 may be an inferior cable with greater loss than the remaining main section between the base station 3 and the attenuator 16. The attenuator 16 is a resistive network. The second cable 12 has an end 18 at a position corresponding substantially to the position of the attenuator 16 so that the first and second cables 7 and 12 extend beside one another over an overlapping length of 20 meters corresponding to the length of the end section of the first cable 7.

A train travelling along the railway track 8 is equipped with a mobile radio and has, on the front of the train, an antenna which detects the radio field set up by the nearby cable 7 or 12. As the train proceeds from the railway station 1 to the railway station 9, the strength of the first radio field radiated from the cable 7 (and consequently the magnitude of the signal detected by the mobile radio) will gradually decrease as indicated at 20 in FIG. 9. When the front end of the train passes the attenuator 16, the signal strength will drop sharply as indicated at 22. This sharp drop in the radio signal from the cable 7 is chosen to pass through the roaming threshold T1, ie the magnitude of received signal strength below which the mobile radio commences its routine to initiate call handover to another base station. As the train proceeds towards the next railway station 2, the strength of signal received from the first cable continues to decrease, passing eventually through the usable signal threshold T2 below which the signal is likely to be too weak to be usable.

Once the train has passed the position corresponding to the attenuator 16, the received signal strength 23 of the second radio field from the cable 12 will be sufficiently strong, ie its magnitude will be in excess of the roaming threshold T1 as indicated at 24. Hence, the mobile radio on the train will establish contact with the second radio field well before the signal strength of the first radio field passes below the usable signal threshold T2. This ensures that the mobile radio effects call handover onto the second radiating cable 12 before leaving the transition area defined by the overlapping lengths of cables 7 and 12. This overlapping length is chosen to ensure that handover occurs within the overlapping length at the maximum speed of the train.

A similar arrangement is provided beside the railway track 15, where an attenuator 25 is incorporated near the end of a radiating cable 26 fed from the base station 4. In this case call handover is from the cable 26 to a cable 27 connected to the base station 3. Important features of the radio telephone apparatus are:

1. The attenuator is selected to provide a defined signal reduction which ensures that the radio will be triggered to register.
2. The section of radiating cable from the attenuator to the cable end provides satisfactory radio coverage for the period of registration.
3. The zone of extended coverage provided by the end section of the cable is predictable and thereby reliable when compared to the otherwise uncertain "free space" case.

Using this method the following requirements are met:
1. The signals between base stations remain isolated so that channel management is not degraded.
2. The cost is not adversely affected since the attenuator replaces a cable terminator.

I claim:

1. Radio telephone apparatus comprising a first base station, a first radiating cable extending from the first base station to a remote end, a second base station, a second radiating cable extending from the second base station and terminating in a remote end, the two remote ends being located in a transition area where a mobile radio effects call handover from the first base station to the second base station, an attenuator being incorporated in the first radiating cable adjacent the end thereof to cause the mobile radio to sense the diminution in the radiated signal caused by the attenuator and thereby to commence call handover from the first base station to the second base station.

2. Apparatus according to claim 1 and fitted in an underground railway system, the first and second base stations being located at respective railway stations and the radiating cables extending along a tunnel bore interconnecting the railway stations.

3. Apparatus according to claim 1, wherein the attenuator is a resistive network.

4. Apparatus according to claim 1, wherein the first cable comprises a main section extending up to the attenuator and a second section extending from the attenuator to the end of the first cable, the second section having higher loss characteristics than the main section.

5. Apparatus according to claim 4, wherein the second section has a length between 15 meters and 25 meters.

6. Apparatus according to claim 5, wherein the second section has a length of the order of 20 meters.

7. Radio telephone apparatus comprising a mobile radio, a first base station, a first radiating cable extending from the first base station to a remote end, the first radiating cable producing a first radio field, a second base station, a second radiating cable extending from the second base station and terminating in a remote end, the second radiating cable producing a second radio field, the two remote ends being located in a transition area where the mobile radio effects call handover from the first base station to the second base station, the mobile radio detecting when a received signal falls below a threshold corresponding to a magnitude of received signal below which the mobile radio commences call handover, an attenuator being incorporated in the first radiating cable adjacent the end thereof to cause a sudden diminution in the first radio field such that when the mobile radio is in the transition area the received signal resulting from the first field drops suddenly through the threshold after the received signal from the second field rises above the threshold, thereby to effect call handover from the first base station to the second base station.

8. A radio transmission system for providing communication between a base station and a vehicle, moving in a known direction, said vehicle traveling in a controlled environment in which transmission is restricted, said system comprising:

a first base station for transmitting and receiving communication signals having a first cable extending to a remote end therefrom within the controlled environment, to carry said communication signals, the strength of said signal gradually diminishing, as the vehicle travels towards said remote end, to a non-operational level;

a second base station for transmitting and receiving communication signals, located remote from said first base station in said direction of travel, having a second cable extending to a remote end therefrom towards said first base station within the controlled environment, to carry said communication signals, said second cable overlapping said first cable for a predetermined distance;

a mobile unit mounted on the vehicle for receiving and transmitting communicate signals to and from said first and second base stations as the vehicle travels in the controlled environment, said mobile unit constructed to sense the strength of the communication signals received from each of said base stations, and to initiate a handoff process when a drop in signal strength is sensed; and an attenuator connected to said first cable at a position spaced from said remote end a distance at which the signal strength of said first base station is within an operational range, said attenuator operating to cause a reduction in strength sufficient to cause the mobile unit to initiate handoff, at a distance at which the signal strength of said first base station is within its operational range, to avoid loss of communications.

* * * * *